United States Patent [19]

Shinmoto

[11] Patent Number: 4,856,361
[45] Date of Patent: Aug. 15, 1989

[54] REVERSE SYNCHRONIZER WITH A SMALLER SYNCHRONIZATION CAPACITY THEN THE FORWARD GEAR SYNCHRONIZERS

[75] Inventor: Toshiharu Shinmoto, Hiroshima, Japan

[73] Assignee: Mazda Motor Corporation, Hiroshima, Japan

[21] Appl. No.: 91,782

[22] Filed: Sep. 1, 1987

[30] Foreign Application Priority Data

Sep. 9, 1986 [JP] Japan .................................. 61-212485

[51] Int. Cl.$^4$ ............................................. F16H 3/38
[52] U.S. Cl. ....................................... 74/339; 192/53 F
[58] Field of Search .......................... 74/339; 192/53 F

[56] References Cited

U.S. PATENT DOCUMENTS

| | | | |
|---|---|---|---|
| 4,300,668 | 11/1981 | Nozawa et al. | 74/339 X |
| 4,309,915 | 1/1982 | Nozawa et al. | 74/339 |
| 4,314,627 | 2/1982 | Nozawa | 74/339 X |

FOREIGN PATENT DOCUMENTS 60-44640  3/1985  Japan .
803979  11/1958  United Kingdom ............. 192/53 F

*Primary Examiner*—Leslie A. Braun
*Assistant Examiner*—Christopher C. Campbell
*Attorney, Agent, or Firm*—Gerald J. Ferguson, Jr.

[57] ABSTRACT

In a manual transmission for a vehicle, the reverse gear train is also provided with a synchronizer. The reverse synchronizer has a synchronization capacity smaller than that of the forward speed synchronizer for a given operating force.

3 Claims, 2 Drawing Sheets

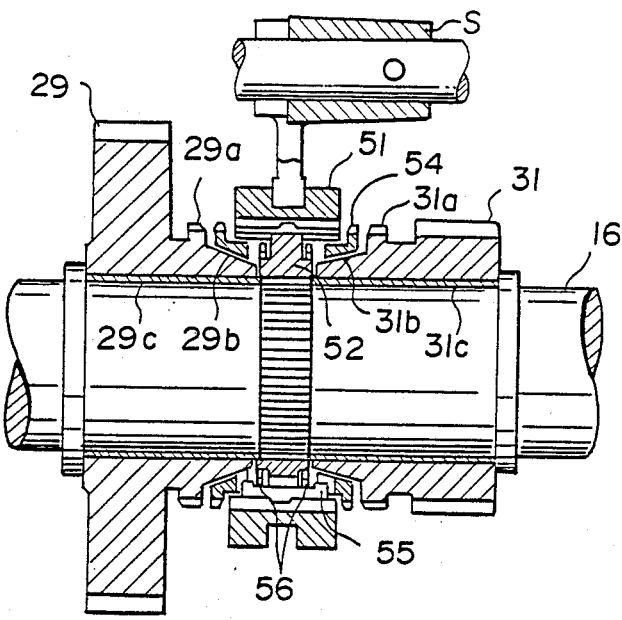
FIG. 2
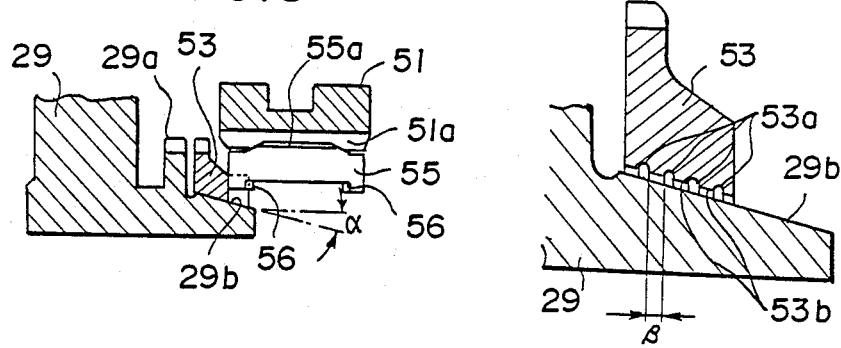
FIG. 3
FIG. 4
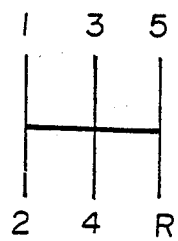
FIG. 5

REVERSE SYNCHRONIZER WITH A SMALLER SYNCHRONIZATION CAPACITY THEN THE FORWARD GEAR SYNCHRONIZERS

BACKGROUND OF THE INVENTION

1. Field of the Invention

This invention relates to a manual transmission having a reverse, and more particularly to a manual transmission having a reverse in which shifting is effected by way of a synchronizer.

2. Description of the Prior Art

As is well known, gear shifting in the manual transmission is effected by selectively bringing one of the gear trains into driving engagement. Manual transmissions are divided into several types, such as the selective sliding type, permanent mesh type, synchromesh type and the like according to the manner of selectively bringing one of the gear trains into driving engagement. For a vehicle, the synchromesh type transmission is generally employed so that shifting can be easily effected while the vehicle is in motion. However, if the transmission is arranged so that the gear can be easily shifted into reverse, for example, there is a fear that the reverse gear may be selected by mistake when the intended gear selection was fourth gear from fifth gear when the direction of motion of the shift lever in fifth gear is in line with that for selecting reverse gear as shown in FIG. 5. Accordingly, a selective sliding type transmission mechanism or the like has been employed for reverse so that the gears cannot be shifted into reverse too easily.

On the other hand, in the conventional manual transmission in which the selective sliding type transmission mechanism is employed for reverse, there has been a problem that when there is a rapid shift into reverse gear from a forward gear, the shift into reverse does not proceed smoothly and is apt to be accompanied by noise owing to the rotation of the idler gear and shaft which continue to rotate for a while under the force of inertia. Thus, it has been proposed to employ the synchromesh type transmission mechanism also for reverse. See Japanese Unexamined Pat. Pub. No. 60(1985)-44640, for instance.

SUMMARY OF THE INVENTION

In view of the foregoing observations and description, the primary object of the present invention is to provide a manual transmission in which the shift into reverse gear can be easily performed without fear that reverse gear may be shifted into by mistake during forward motion of the vehicle.

In accordance with the present invention, the reverse gear train is also provided with a synchronizer. The reverse synchronizer has a synchronization capacity smaller than that of the forward speed synchronizers for a given operating force. The "synchronization capacity" corresponds to shifting facility, and as the synchronization capacity becomes small, a larger operating force is required for gear shifting.

BRIEF DESCRIPTION OF THE DRAWINGS

FIG. 2 is a cross-sectional view showing the synchronizer for reverse employed in the transmission shown in FIG. 1, FIG. 3 is an enlarged cross-sectional view of a part of the synchronizer for reverse, FIG. 4 is cross-sectional view of the cone employed in the synchronizer for reverse, and FIG. 5 is a schematic view showing an example of gearshift pattern.

DESCRIPTION OF THE PREFERRED EMBODIMENT

Figure 1:
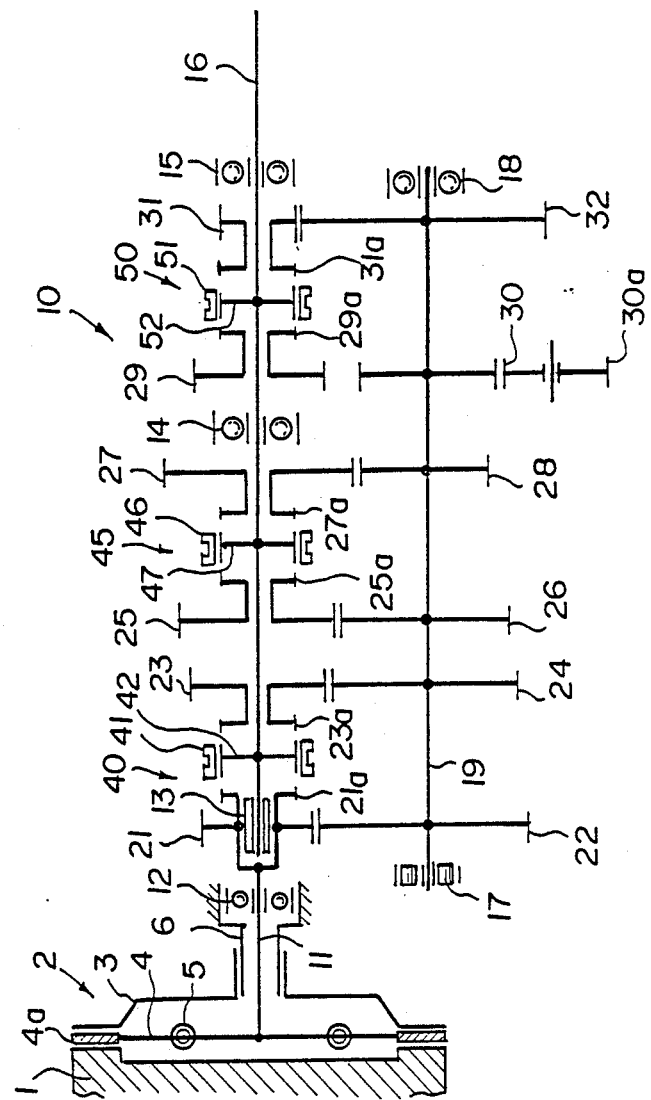
FIG. 1 is a schematic view showing a manual transmission in accordance with an embodiment of the present invention.

In FIG. 1, a clutch 2 is opposed to an engine flywheel 1 to control transmission of driving power to a transmission 10. The clutch 2 comprises a pressure plate 3 mounted for axial sliding motion on a sleeve 6 fixed to the transmission housing (not shown), and a clutch plate 4 disposed between the flywheel 1 and the pressure plate 3, the clutch plate 4 having a facing 4a adapted to be pressed against the flywheel 1 by the pressure plate 3. The clutch plate 4 is connected to an input shaft 11 of the transmission 10. A damper 5 is mounted on the clutch plate 4 to absorb shock when the clutch engages. The pressure plate 3 is urged toward the clutch plate 4 under the force of a spring or the like (not shown) so that the driving power of the engine is normally transmitted to the input shaft 11. When the clutch pedal is pushed down, the facing 4a of the clutch plate 4 is moved away from the flywheel 1, overcoming the pressure of the pressure plate 3, and the clutch is disengaged.

The input shaft 11 is supported for rotation by a ball bearing 12. The input shaft 11 is in line with an output shaft 16 with the rear end of the input shaft 11 connected with the front end of the output shaft 16 by way of a roller bearing 13 to be rotatable relative to each other. A counter shaft 19 is supported for rotation by a pair of bearings 17 and 18 in parallel to the shafts 11 and 16 therebelow. An input gear 21 is fixed to the input shaft 11 and in mesh with a countergear 22 fixed to the countershaft 19. A third speed drive gear 24, a second speed drive gear 26, a first speed drive gear 28, a reverse drive gear 30 and a fifth speed drive gear 32 are fixed to the counter shaft 19 in this order from the front to the rear. These gears 24, 26, 28, 30 and 32 are respectively in mesh with a third speed driven gear 23, a second speed driven gear 25, a first speed driven gear 27, a reverse driven gear 29 and a fifth speed driven gear 31 which are mounted for rotation on the output shaft 16 though the reverse drive gear 30 is in mesh with the reverse driven gear 29 by way of an idler gear 30a. Synchronizing cones and gear splines 21a, 23a, 25a, 27a, 29a and 31a are provided on the input gear 21, the third speed driven gear 23, the second speed driven gear 25, the first speed driven gear 27, the reverse driven gear 29 and the fifth speed driven gear 31 respectively. The cones and the gear splines form first to third synchronizers 40, 45 and 50 together with clutch hubs 42, 47 and 52 fixed to the output shaft 16 and clutch sleeves 41, 46 and 51 mounted on the clutch hubs for sliding motion.

In this transmission, operation of the shift lever by the driver is transmitted to the clutch sleeves 41, 46 and 51 by way of a shift link, a shift fork or the like. When the clutch sleeve 41 of the first synchronizer 40 is moved forward (leftward in FIG. 1) on the clutch hub 42, the clutch sleeve 41 is brought into mesh with the gear spline 21a on the side of the input gear 21, whereby the input shaft 11 is directly connected to the output shaft 16 and the gears are shifted into fourth speed. On the other hand, when the clutch sleeve 41 is moved rightward to be engaged with the gear spline 23a on the side of the third speed driven gear 23, the rotation of the countershaft 19 driven by way of engagement of the countergear 22 with the input gear 21 is transmitted to the third speed drive gear 24 and the third speed driven gear 23, whereby the gears are shifted into third speed. By axially sliding the clutch sleeve 46 of the second synchronizer 45, the gears are shifted into second speed and first speed in a similar manner.

By axially sliding the clutch sleeve 51 of the third synchronizer 50 on the clutch hub 52, the gears are shifted into reverse and fifth speed. That is, when the sleeve 51 is moved leftward to be engaged with the gear spline 29a on the reverse driven gear 29, rotation of the countershaft 19 is transmitted to the reverse driven gear 29 by way of the reverse drive gear 30 and the idler gear 30a, whereby the gears are shifted into reverse. On the other hand, when the sleeve 51 is moved rightward to be engaged with the gear spline 31a on the fifth speed driven gear 31, the gears are shifted into fifth speed. As can be understood from the description above, the first synchronizer 40 is for shifting into fourth speed and third speed, the second synchronizer 45 is for shifting into second speed and first speed, and the third synchronizer 50 is for shifting into reverse and fifth speed.

As shown in FIGS. 2 and 3, the third synchronizer 50 is interposed between the reverse driven gear 29 and the fifth speed driven gear 31 which are mounted for rotation on the output shaft 16 respectively by way of bearings 29c and 31c. A hub 52 is rigidly connected to the output shaft 16 by way of splines, and the sleeve 51 is fitted on the hub 52 by way of splines to be slidable in the axial direction. The hub 52 is provided with a plurality of diametric grooves and synchronizer key 55 is disposed in the grooves and outwardly urged by springs 56. A tapered surface 29b is formed on the reverse driven gear 29 at a portion on the right side of the gear spline 29a, and a clutch cone 53 is disposed around the tapered surface 29b to be rotatable relative thereto. Similarly, a tapered surface 31b is formed on the fifth speed driven gear 31 at a portion on the left side of the gear spline 31a, and a clutch cone 54 is disposed around the tapered surface 31b to be rotatable relative thereto. The inclination $\alpha$ (FIG. 3) of the tapered surface 29b is larger than the inclination of the similar tapered surfaces of the other synchronizers so that the synchronization capacity of the reverse synchronizer is smaller than that of the other synchronizers as will be described in more detail later.

A shift fork S is in engagement with a groove formed on the outer peripheral surface of the sleeve 51, and when operation of the shift lever by the driver is transmitted to the shift fork, the sleeve 51 is moved in the axial direction. To shift into reverse, the sleeve 51 is moved leftward, and the synchronizer key 55 is moved leftward together with the sleeve 51 to abut against the opposed side surface of the cone 53 to push leftward the cone 53. This causes the inner tapered surface of the cone 53 to abut against the tapered surface 29b of the gear spline 29, and the output shaft 16 is brought into synchronization with the reverse driven gear 29 by the frictional force between the tapered surfaces. Thereafter the sleeve 51 is further moved leftward over protrusions 55a formed on the outer surface of the synchronizer key 55, and inner splines 51a of the sleeve 51 are brought into engagement with the gear spline 29a whereby rotation of the reverse driven gear 29 is transmitted to the output shaft 16. At this time, the inner splines 51a of the sleeve 51 can be smoothly brought into engagement with the gear spline 29a since the reverse driven gear 29 and the output shaft 16 have been synchronized.

The time required to synchronize the reverse driven gear 29 and the output shaft 16 depends upon the frictional force between the inner tapered surface of the cone 53 and the tapered surface 29b on the reverse driven gear 29. That is, when the frictional force is large, synchronization of the driven gear 29 and the output shaft 16 is relatively easily obtained, i.e., synchronization capacity is large, and on the other hand, when the frictional force is small, the synchronization is hard to obtain, i.e., the synchronization capacity is small. As the inclination $\alpha$ of the tapered surface 29b becomes smaller, the frictional force between the tapered surfaces is increased for a given force to axially push the sleeve 51, that is, the synchronization capacity for a given operating force is increased. In this particular embodiment, the reverse synchronizer is given a synchronization capacity smaller than those of the other synchronizers by making the inclination $\alpha$ of the tapered surface 29b of the reverse synchronizer larger than the inclination of the similar tapered surface of the other synchronizers. Accordingly, the operating force required to shift into reverse is larger than that required to shift into any one of first to fifth speeds, and the shift into reverse gear can be easily performed without fear that reverse gear will be shifted into by mistake during forward motion.

The synchronization capacity can also be controlled by selecting the width $\beta$ of lands 53b on the inner surface of the cone 53 formed by forming a plurality of grooves 53a extending in the peripheral direction as shown in FIG. 4. That is, as the width $\beta$ is decreased, the surface pressure of the lands 53b when the cone 53 is axially pushed is increased and the grip of the cone 53 on the tapered surface 29b is improved, thereby increasing the synchronization capacity. Specifically, when the tapered inner surface of clutch cone 53 and the tapered surfacer 29b of driven gear 29 do not frictionally engage each other, oil for cooling and lubricating is provided therebetween. When these tapered surfaces engage each other, the oil is scraped off. The amount of oil scraped off influences the magnitude of the coefficient of friction. As the surface pressure increases, more oil is scraped off and the coefficient of friction increases, thereby increasing the synchronization capacity. Thus, because it is assumed that as $\beta$ decreases the surface pressure increases, scraping off more oil. This increases the coefficient of friction which increases the synchronization capacity.

I claim:

1. A manual transmission having at least one forward speed gear train each including a pair of gears respectively mounted on input and output shafts one gear being rigidly connected to one of the input and output shafts and the other gear being mounted on the other shaft to be rotatable relative to the other shaft, and a reverse gear train including a pair of gears respectively mounted on the input and output shafts one gear being rigidly connected to one of the input and output shafts and the other gear being mounted on the other shaft to be rotatable relative to the other shaft, the pair of gears in each gear train being permanently interlocked, each other gear having a tapered surface, and each gear train being provided with a synchronizer which comprises:

a clutch hub fixedly mounted on the other shaft and drivingly connecting both other gears to the other shaft,
  gear splines integrally formed on both other gears,
  a clutch sleeve engagable with the clutch hub to be rotated together therewith and movable in an axial direction of the clutch hub to engage the gear splines,
  a pair of clutch cones each having a tapered inner surface opposed to the tapered surface formed on a respective other gear and rotatable together with the clutch sleeve when the clutch sleeve is moved to engage the gear splines, and
  a synchronizer key movable in response to sliding motion of the clutch sleeve to move one of the clutch cones in the axial direction of the clutch hub to bring the tapered inner surface of the moved clutch cone into frictional engagement with the tapered surface on its respective other gear,
  wherein the improvement comprises that the synchronization capacity of the synchronizer for the reverse speed is smaller than that of the synchronizer for the forward speed for a given operating force, and the angle of taper of the tapered surface on the other gear is larger in the synchronizer for the reverse speed than in the synchronizer for the forward speed.

2. A manual transmission having at least one forward speed gear train each including a pair of gears respectively mounted on input and output shafts one gear being rigidly connected to one of the input and output shafts and the other gear being mounted on the other shaft to be rotatable relative to the other shaft, and a reverse gear train including a pair of gears respectively mounted on the input and output shafts one gear being rigidly connected to one of the input and output shafts and the other gear being mounted on the other shaft to be rotatable relative to the other shaft, the pair of gears in each gear train being permanently interlocked, each other gear having a tapered surface, and each gear train being provided with a synchronizer which comprises:

a clutch hub fixedly mounted on the other shaft and drivingly connecting both other gears to the other shaft,
  gear splines integrally formed on both other gears,
  a clutch sleeve engagable with the clutch hub to be rotated together therewith and movable in an axial direction of the clutch hub to engage the gear splines,
  a pair of clutch cones each having a tapered inner surface opposed to the tapered surface formed on a respective other gear and rotatable together with the clutch sleeve when the clutch sleeve is moved to engage the gear splines, and
  a synchronizer key movable in response to sliding motion of the clutch sleeve to move one of the clutch cones in the axial direction of the clutch hub to bring the tapered inner surface of the moved clutch cone into frictional engagement with the tapered surface on its respective other gear,
  wherein the improvement comprises that the synchronization capacity of the synchronizer for the reverse speed is smaller than that of the synchronizer for the forward speed for a given operating force, and a contact area between the tapered surface on the other gear and the tapered inner surface of the clutch cone is larger in the synchronizer for the reverse speed than in the synchronizer for the forward speed.

3. A manual transmission as defined in claim 2 in which the tapered inner surface of the clutch cone is provided with a plurality of grooves extending in a peripheral direction of the clutch cone and a plurality of lands, each land being disposed between adjacent grooves, the width of each land being larger in the synchronizer for the reverse speed than in the synchronizer for the forward speed.

* * * * *